(12) United States Patent
Xu et al.

(10) Patent No.: US 10,809,453 B2
(45) Date of Patent: Oct. 20, 2020

(54) DISPLAY DEVICE (71) Applicants: BOE Technology Group Co., Ltd., Beijing (CN); Chengdu BOE Optoelectronics Technology Co., Ltd., Chengdu, Sichuan (CN)

(72) Inventors: Bing Xu, Beijing (CN); Dongwang Jia, Beijing (CN); Junping Bao, Beijing (CN); Xinghua Li, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 17 days.

(21) Appl. No.: 16/193,391

(22) Filed: Nov. 16, 2018

(65) Prior Publication Data
US 2019/0302352 A1 Oct. 3, 2019

(30) Foreign Application Priority Data

Mar. 27, 2018 (CN) .......................... 2018 1 0257119

(51) Int. Cl.
*F21V 8/00* (2006.01)
*G02F 1/133* (2006.01)
(Continued)

(52) U.S. Cl.
CPC ......... *G02B 6/0088* (2013.01); *G02B 6/0005* (2013.01); *G02B 6/0051* (2013.01);
(Continued)

(58) Field of Classification Search
CPC .. G02B 6/0088; G02B 6/0005; G02B 6/0051; G02B 6/0075; G02F 1/13318;
(Continued)

(56) References Cited

U.S. PATENT DOCUMENTS

| 4,614,406 A * | 9/1986 | Motoi | B60K 35/00 345/204 |
| 6,254,245 B1 * | 7/2001 | Uehara | F21V 7/005 349/65 |

(Continued)

FOREIGN PATENT DOCUMENTS

| CN | 1272635 A | 11/2000 |
| CN | 1940666 A | 4/2007 |

(Continued)

OTHER PUBLICATIONS

First Office Action dated Jul. 7, 2020, for corresponding Chinese application 201810257119.5.

*Primary Examiner* — Mary Ellen Bowman
(74) *Attorney, Agent, or Firm* — Nath, Goldberg & Meyer; Joshua B. Goldberg; Stephanie F. Majkut (57) ABSTRACT

The present disclosure provides a display device which includes a liquid crystal display panel and a backlight assembly. The backlight assembly includes a light diffusion component and a light emitting component optically coupled to the light diffusion component. The display device further includes a light guide component configured to direct ambient light to the light diffusion component.

15 Claims, 5 Drawing Sheets

(51) Int. Cl.
 *G02F 1/1333* (2006.01)
 *G02F 1/13357* (2006.01)
(52) U.S. Cl.
 CPC ....... *G02B 6/0075* (2013.01); *G02F 1/13318* (2013.01); *G02F 1/133308* (2013.01); *G02F 1/1336* (2013.01); *G02F 2001/133317* (2013.01); *G02F 2001/133618* (2013.01)
(58) Field of Classification Search
 CPC ............. G02F 1/133308; G02F 1/1336; G02F 2001/133317; G02F 2001/133618
 See application file for complete search history.

(56) References Cited

U.S. PATENT DOCUMENTS

| | | | | |
|---|---|---|---|---|
| 6,369,866 B1* | 4/2002 | Rai | ................ | G02B 6/003 349/61 |
| 9,030,627 B1* | 5/2015 | Baldwin | ............ | G02F 1/133606 349/62 |
| 9,443,477 B2* | 9/2016 | Yu | ................ | G02B 6/0028 |
| 2004/0032659 A1* | 2/2004 | Drinkwater | ........... | F21V 33/006 359/558 |
| 2004/0227719 A1* | 11/2004 | Chang | ............. | G02F 1/1336 345/102 |
| 2008/0259250 A1* | 10/2008 | Kleverman | ........... | G02B 6/0011 349/68 |
| 2009/0045722 A1* | 2/2009 | Bai | ................ | G02F 1/1336 313/504 |

FOREIGN PATENT DOCUMENTS

| | | |
|---|---|---|
| CN | 101290414 A | 10/2008 |
| CN | 101354494 A | 1/2009 |
| CN | 102494297 A | 6/2012 |
| CN | 103017090 A | 4/2013 |
| CN | 103032811 A | 4/2013 |
| CN | 103047614 A | 4/2013 |
| CN | 103836523 A | 6/2014 |
| CN | 104279516 A | 1/2015 |
| JP | 2007047811 A | 2/2007 |

\* cited by examiner

DISPLAY DEVICE

CROSS-REFERENCE TO RELATED APPLICATION

The present disclosure claims the priority to the Chinese Patent Application No. 201810257119.5, filed on Mar. 27, 2018, the entire contents of which are incorporated herein by reference.

TECHNICAL FIELD

The present disclosure relates to the field of display technology, in particular, to a display device.

BACKGROUND

As a traditional decoration, a mural brings visual delights to people. However, the traditional mural painted on the paper can show only a single picture, which is likely to cause the aesthetic fatigue. Furthermore, it is a time-consuming and laborious work to replace a mural, and a lot of paper is wasted.

SUMMARY

The present disclosure provides a display device including a liquid crystal display panel and a backlight assembly; the backlight assembly including a light diffusion component and a light emitting component optically coupled to the light diffusion component; wherein the display device further includes a light guide component configured to direct ambient light to the light diffusion component.

In some embodiments, the light diffusion component is a light guide plate including a light outgoing surface and four side surfaces connected to the light outgoing surface, the light emitting component is optically coupled to at least one of the side surfaces, and the light guide component is configured to direct the ambient light to the at least one of the side surfaces.

In some embodiments, the liquid crystal display panel is a transflective liquid crystal display panel.

In some embodiments, the display device further includes an outer frame for fixing the liquid crystal display panel and the backlight assembly together; the outer frame includes an annular base plate provided in periphery of a display region of the liquid crystal display panel and a side wall connected to the annular base plate; and the light guide component is provided within an accommodation space formed by the annular base plate and the side wall.

In some embodiments, the annular base plate includes four strip-like portions connected together in sequence, and at least one of the strip-like portions has at least one hole provided therein; and the light guide component includes at least one light guide pipe for transmitting light, each of the at least one light guide pipe includes a light input port and a light output port, the light input port is provided at the hole to receive the ambient light, and the light output port is configured to emit the ambient light outwards.

In some embodiments, the light guide component further includes a light homogenizing component provided at the light output port, and the light homogenizing component is configured to convert the ambient light emitted from the light output port into reflection light with a uniform intensity, and direct the reflection light to the at least one of the side surfaces.

In some embodiments, each of the at least one light guide pipe includes: at least one light guide branch pipe connected to the at least one hole, respectively, each of the at least one light guide branch pipe including a first port and a second port provided opposite to each other, the first port being the light input port; a transmission pipe including a third port and a fourth port provided opposite to each other, the third port being configured to be connected to the second port of each light guide branch pipe, the fourth port being the light output port. The transmission pipe is provided therein with a reflection structure for directing light which is emitted from the at least one light guide branch pipe to be transmitted along the transmission pipe.

In some embodiments, each of the at least one light guide pipe includes: at least one light incoming pipe connected to the at least one hole, each of the at least one light incoming pipe including a first port and a second port provided opposite to each other, the first port being the light input port; and a transmission pipe including a third port and a fourth port provided opposite to each other, the third port being configured to be connected to the second port of each light incoming pipe, the fourth port being the light output port. At least one optical fiber or at least one one-dimension defect photonic crystal light pipe runs through the at least one light incoming pipe and the transmission pipe.

In some embodiments, each of the strip-like portions is provided with at least one hole therein; the display panel includes four light guide pipes, the transmission pipes of which are located at four corners of the light guide plate, respectively; and the third port of each transmission pipe is configured to be connected to all the light guide branch pipe located at one respective side surface of the light guide plate; and the number of the light homogenizing components is four, and the light homogenizing components are provided close to the four side surfaces of the light guide plate, respectively.

In some embodiments, the light homogenizing component is a reflection cover, and a reflection surface of the reflection cover is configured to form a preset angle with respect to a side surface of the light guide plate close to the reflection surface such that the ambient light emitted from the light output port is reflected by the reflection surface and is directed to a side surface of the light guide plate close to the reflection surface.

In some embodiments, the display device further includes: a light sensing component configured to sense an intensity of the ambient light around the display device to generate a sensed intensity value; and a control circuit coupled to the light sensing component, the control circuit being configured to compare the sensed intensity value with a reference intensity value to generate a comparative result, and control a luminous intensity of the light emitting component according to the comparative result.

In some embodiments, the control circuit is further configured to turn off or dim light emitted by the light emitting component when the comparative result indicates that the sensed intensity value is greater than the reference intensity value; and turn on or lighten the light emitted by the light emitting component when the comparative result indicates that the sensed intensity value is equal to or less than the reference intensity value.

In some embodiments, the light diffusion component is a diffusion plate including a light outgoing surface and a bottom surface opposite to the light outgoing surface, the light emitting component is optically coupled to the bottom surface, and the light guide component is configured to direct the ambient light to the bottom surface.

In some embodiments, the light guide component further includes a light homogenizing component provided at the light output port, and the light homogenizing component is configured to convert the ambient light emitted from the light output port into reflection light with a uniform intensity, and direct the converted reflection light to the bottom surface.

In some embodiments, the display device further includes: a light sensing component configured to sense an intensity of the ambient light around the display device to generate a sensed intensity value; and a control circuit coupled to the light sensing component, the control circuit being configured to compare the sensed intensity value with a reference intensity value to generate a comparative result, and control a luminous intensity of the light emitting component according to the comparative result. Light emitted by the light emitting component is turned off or dimmed when the comparative result indicating that the sensed intensity value is greater than the reference intensity value; and the light emitted by the light emitting component is turned on or lightened when the comparative result indicating that the sensed intensity value is equal to or less than the reference intensity value.

DETAILED DESCRIPTION

The embodiments provided by the present disclosure will be described below in detail in conjunction with the drawings in order that a person skilled in the art can understand the technical solutions of the present disclosure better.

Figure 1A:
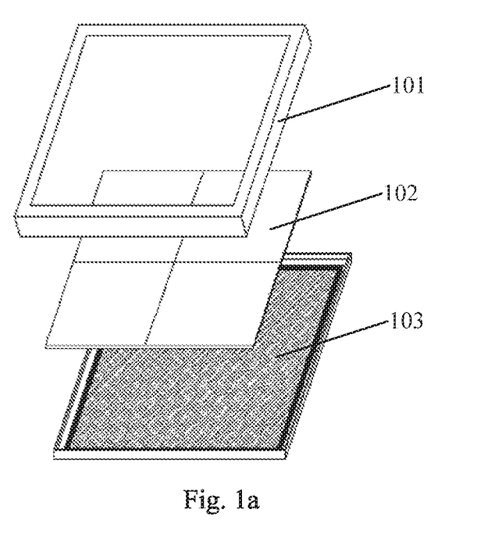
FIG. 1a is a schematic diagram of a structure of an existing mural display device.
Figure 1B:
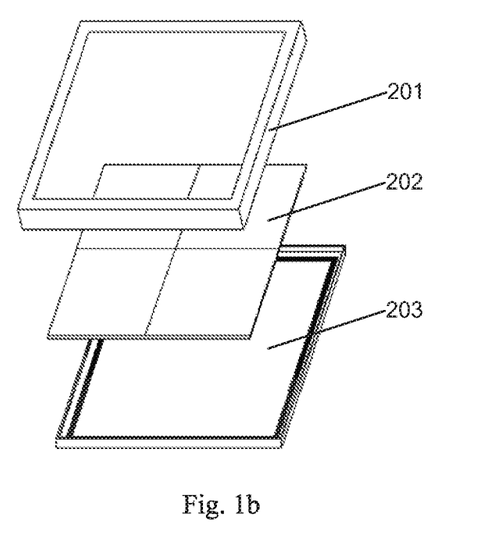
FIG. 1b is a schematic diagram of a structure of another existing mural display device.

In some cases, an electronic display screen may be made into a digital mural on which display images may be updated constantly so as to avoid the aesthetic fatigue and save manpower and material resources. FIGS. 1a and 1b are schematic diagrams of structures of two common mural display devices. The mural display device shown in FIG. 1a includes an outer frame 101 used as a picture frame, a liquid crystal display (LCD) panel 102, and a backlight assembly 103 for supplying light for displaying images to the liquid crystal display panel 102. The mural display device shown in FIG. 1b includes an outer frame 201 used as a picture frame, an electronic-paper (E-paper) 202 configured to reflect ambient light to display an image, and a rear cover 203.

It is necessary that the backlight assembly supplies continuously the light for displaying images to the liquid crystal display panel, and the E-paper can only display an image by reflecting the ambient light. The above two types of common mural display devices both have a disadvantage that source of the light for display images is single.

Figure 2A:
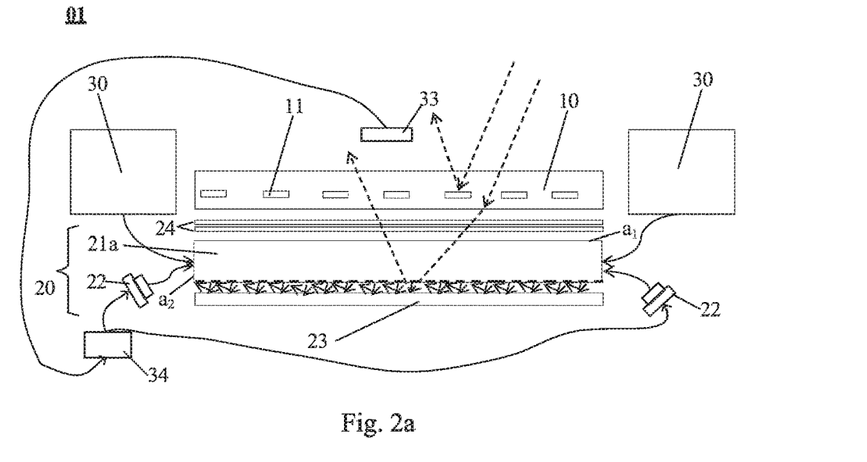
FIG. 2a is a schematic cross-sectional view of a structure of a display device according to an embodiment of the present disclosure.

As shown in FIG. 2a, an embodiment of the present disclosure provides a display device 01 which includes a liquid crystal display panel 10 and a backlight assembly 20. The backlight assembly 20 includes a light guide plate 21a including a light outgoing surface $a_1$ and four side surfaces $a_2$ connected to the light outgoing surface $a_1$. The backlight assembly 20 further includes a light emitting component 22 which is configured to be optically coupled to at least one side surface $a_2$. The display device 01 further includes a light guide component 30 which is configured to direct the ambient light to the at least one side surface $a_2$.

Figure 2B:
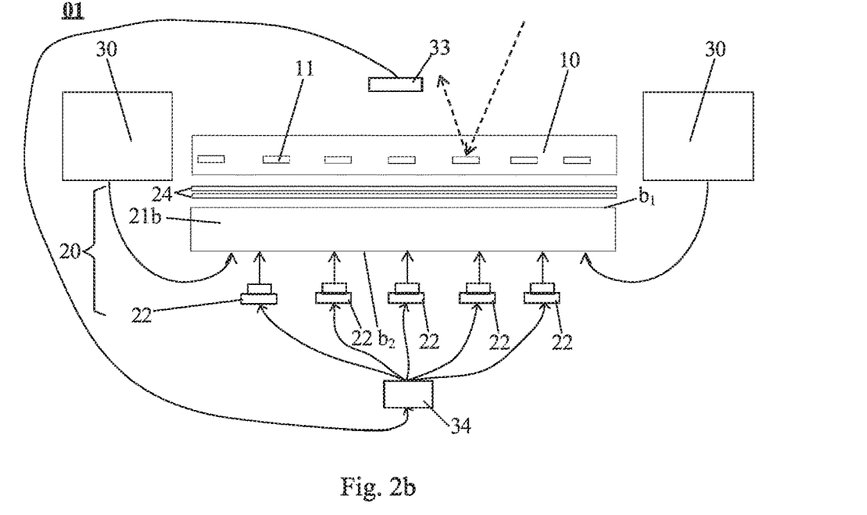
FIG. 2b is a schematic cross-sectional view of a structure of a display device according to an embodiment of the present disclosure.

As shown in FIG. 2b, an embodiment of the present disclosure further provides a display device 01 which includes a liquid crystal display panel 10 and a backlight assembly 20. The backlight assembly 20 includes a diffusion plate 21b including a light outgoing surface $b_1$ and a bottom surface $b_2$ opposite to the light outgoing surface $b_1$. The backlight assembly 20 further includes a light emitting component 22 which is configured to be optically coupled to the bottom surface $b_2$. The display device 01 further includes a light guide component 30 which is configured to direct the ambient light to the bottom surface $b_2$.

It should be noted that, in the above display devices provided by the embodiments of the present disclosure, if the backlight assembly 20 includes the light guide plate 21a, the backlight assembly 20 has an edge type backlight source, and typically the light emitting component 22 (e.g., a LED chip or a lamp tube) is optically coupled to a side surface $a_2$ of the light guide plate 21a; if the backlight assembly 20 includes the diffusion plate 21a, the backlight assembly 20 has a direct type backlight source, and the light emitting component 22 (e.g., a LED chip or a lamp tube) is optically coupled to the bottom surface $b_2$ of the diffusion plate 21b.

As shown in FIG. 2a, a reflector sheet 23 is typically provided at a side of the light guide plate 21a away from the liquid crystal display panel 10 to improve the utilization of the light emitted by the light emitting component 22. As shown in FIGS. 2a and 2b, an optical film 24 is typically provided on each of the light outgoing surfaces of the light guide plate 21a and the diffusion plate 21b.

Here, the light guide plate 21a generally has a plate shape, and the light outgoing surface $a_1$ thereof is a surface of the light guide plate 21a facing the display panel 10; also, the diffusion plate 21b generally has a plate shape, and the light outgoing surface $b_1$ thereof is a surface of the diffusion plate 21b facing the display panel 10.

In the above display device provided by an embodiment of the present disclosure, the light guide component 30 is a component for directing the ambient light, and its location is not particularly limited as long as it can direct the ambient light to at least one side surface $a_2$ of the light guide plate 21a or the bottom surface $b_2$ of the diffusion plate 21b.

Here, the ambient light is external light other than the light emitted by the light emitting component 22 inside the display device.

In a case that the backlight assembly 20 includes the light guide plate 21a, as shown in FIG. 2a, the light guide component 30 may direct the ambient light to a side surface $a_2$ of the light guide plate 21a which is optically coupled to the light emitting component 22. In some embodiments, the light guide component 30 may direct the ambient light to a side surface $a_2$ of the light guide plate 21a which is not optically coupled to the light emitting component 22.

In the above display device provided by an embodiment of the present disclosure, since the light guide component directs the ambient light outside the display device to at least one side surface of the light guide plate or the bottom surface of the diffusion plate in the backlight assembly, the ambient light is used as a supplement of the light for displaying images of the liquid crystal display panel, and thus the above display device provided by an embodiment of the present disclosure can additionally use the ambient light to assist in displaying an image of the liquid crystal display panel while the light emitting component of the liquid crystal display panel exists.

In some embodiments, the light emitted by the light emitting component in the backlight assembly may be turned off or dimmed when the ambient light has a high intensity, and the ambient light directed to the light guide plate or the diffusion plate may be used as part of or all of the light for displaying images of the liquid crystal display panel, thereby reducing the energy consumption of the display device.

In particular, the above display device may be an energy-saving mural display device which allows a user to replace an image freely. Thus, different images can be displayed, and a visual effect of a dynamic mural can be provided to a viewer. Moreover, the backlight assembly in the display device is provided therein a light emitting component and a light guide component, which allows the display device to display an image by at least partly using the ambient light and to display an image by using the light emitting component inside the display device.

In some embodiments, the above liquid crystal display panel 10 provided by embodiments of the present disclosure may be a transflective liquid crystal display panel.

As shown in FIGS. 2a and 2b, an image on the transflective liquid crystal display panel may be displayed by reflecting the ambient light using a reflection layer 11 in the transflective liquid crystal display panel. Moreover, as shown in FIG. 2a, in a case that the backlight assembly has an edge type backlight source, part of the ambient light which transmits through the transflective liquid crystal display panel may be further reflected partially by a reflective material, such as a reflector sheet 23, in the backlight assembly, thereby further supplementing the light for displaying images on the transflective liquid crystal display panel.

Here, a specific structure of the transflective liquid crystal display panel may be the same as a prior art, and a path representing that the ambient light is reflected may be schematically indicated by the dotted lines as shown in FIG. 2a or 2b, in which the reflection layer 11 for reflecting the external ambient light may be structures such as metal electrodes or the like in the panel. Since the transflective liquid crystal display panel is provided therein a half-wave plate and a quarter-wave plate, the ambient light, after entering the transflective liquid crystal display panel and passing through the liquid crystal layer and the wave plates, may have its polarization direction changed, and then a reflection region provided with the reflection layer 11 displays colors. That is, the external ambient light is used for displaying.

In the above two common mural display devices, when displaying an image, it is necessary that the backlight assembly supplies continuously the light for displaying images to the liquid crystal display panel, thus resulting in higher energy consumption. Although the electronic-paper displays an image by reflecting the ambient light and thus has a lower energy consumption, the electronic-paper displays achieves a good display only when the ambient light is sufficient; and moreover, the displayed image has a limited brightness, thereby display effect as a mural is not so good.

Based on the above problems, the above display device provided by an embodiment of the present disclosure may further includes a light sensing component 33 and a control circuit 34 coupled to the light sensing component 33.

The light sensing component 33 is configured to sense an intensity of the ambient light around the display device to generate a sensed intensity value. The light sensing component 33 may be a photosensor such as a photodiode.

The control circuit 34 is configured to compare the sensed intensity value with a reference intensity value to generate a comparative result, and control a luminous intensity of the light emitting component according to the comparative result. For example, the control circuit 34 may be a processor, such as CPU, in which the reference intensity value is stored.

The above step of controlling the luminous intensity of the light emitting component according to the comparative result may particularly include the following two cases.

When the comparative result indicates that the sensed intensity value is greater than the reference intensity value, the light emitted by the light emitting component is turned off or dimmed.

When the comparative result indicates that the sensed intensity value is equal to or less than the reference intensity value, the light emitted by the light emitting component is turned on or lightened.

Figure 3:
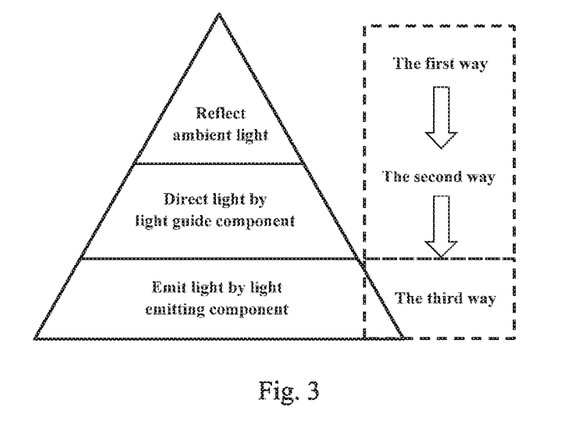
FIG. 3 is a schematic diagram of ways to supply optical energy to a display device according to an embodiment of the present disclosure.

According to the above embodiment, as shown in FIG. 3, there are three ways to provide the light for displaying images to the liquid crystal display panel in the above display device provided by the embodiment of the present disclosure. The first one is to reflect the ambient light by a transflective liquid crystal display panel to display an image, the second one is to direct the ambient light by a light guide component to a side surface of the light guide plate or the bottom surface of the diffusion plate of a backlight assembly, and the third one is to display an image by using the light emitting component of the backlight assembly.

If the ambient light has a high intensity, the light emitted by the light emitting component may be dimmed, and the image may be displayed by using the ambient light mainly, thus reducing the energy consumption of the display device. If the intensity of the ambient light is extremely high (e.g., at noon on a sunny day), the light emitted by the light emitting component may be turned off, and the image is displayed by using the ambient light only, which further reduces the energy consumption of the display device. If the ambient light has a low intensity (e.g., in the dark or with insufficient light), the light emitted by the light emitting component may be turned on or lightened so as to supplement the light for displaying images, which improves the display effect.

That is to say, the image of the liquid crystal display panel may be displayed by the above light guide component using the ambient light, so that the mural can switch images or supply the light for displaying images by using less electric energy, thereby improving the display effect of the mural and reducing the energy consumption.

Figure 4:
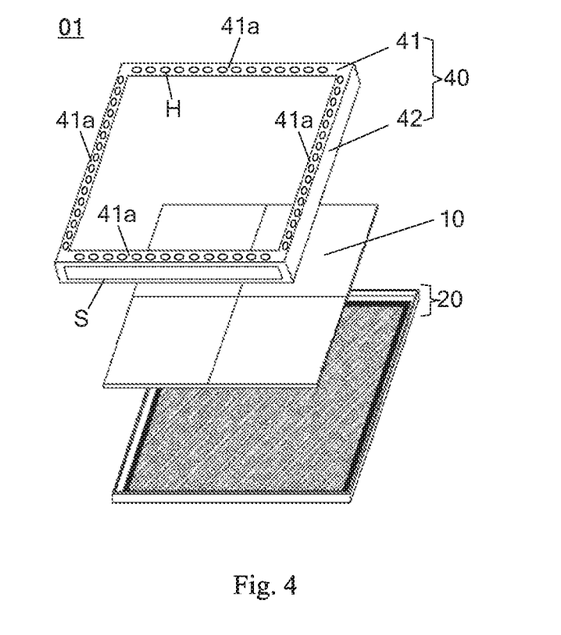
FIG. 4 is a schematic perspective view of a structure of a display device according to an embodiment of the present disclosure.

In some embodiments, as shown in FIG. 4, the above display device 01 further includes an outer frame 40 for fixing the liquid crystal display panel 10 and the backlight assembly 20. The outer frame 40 includes an annular base plate 41 in periphery of a display region of the liquid crystal display panel 10 and a side wall 42 connected to the annular base plate 41.

When the above display device serves as a mural display device, the outer frame 40 is a picture frame. Since it is required that the outer frame of the mural display device has a certain decorative effect, the annular base plate 41 of the outer frame 40, unlike the display device of a handheld terminal (such as a mobile or a tablet) which has a narrow bezel, has a certain area, and an accommodation space is formed by the annular base plate 41 and the side wall 42.

Therefore, as shown in FIG. 4, in an embodiment of the present disclosure, the above light guide component (not shown in figures) is provided within the accommodation space formed by the annular base plate 41 and the side wall 42 so as to improve the space utilization. In FIG. 4, the position of the above accommodation space is indicated by the dotted line S.

As shown in FIG. 4, in some embodiments, the annular base plate 41 particularly includes thur strip-like portions 41a connected together in sequence, in which at least one of the strip-like portions 41a has a plurality of holes H provided therein. In the display device provided by an embodiment of the present disclosure, the light guide component includes a light guide pipe for transmitting light, and the light guide pipe includes a light input port and a light output port. The light input port is provided at the hole H to receive the ambient light, and the light output port is configured to emit the ambient light outwards.

Further, in order that the ambient light can enter the light guide plate or the diffusion plate uniformly, the light guide component may further includes a light homogenizing component provided at the light output port. The light homogenizing component is configured to convert the ambient light emitted from the light output port into diffuse light.

The light homogenizing component may include any one of a reflection cover, a light homogenizing rod, and a diffuse reflector. In a case that the backlight assembly includes a light guide plate and the light homogenizing component includes a reflection cover, a reflection surface of the reflection cover is configured to form a preset angle with respect to a side surface of the light guide plate close to the reflection surface such that the diffuse light is directed to the side surface of the light guide plate close to the reflection surface of the reflection cover.

The light guide pipe may transmit light through various light paths. Next, an embodiment of a specific structure of the light guide component will be described in detail below in a case that the backlight assembly has an edge type backlight source.

Figure 5:
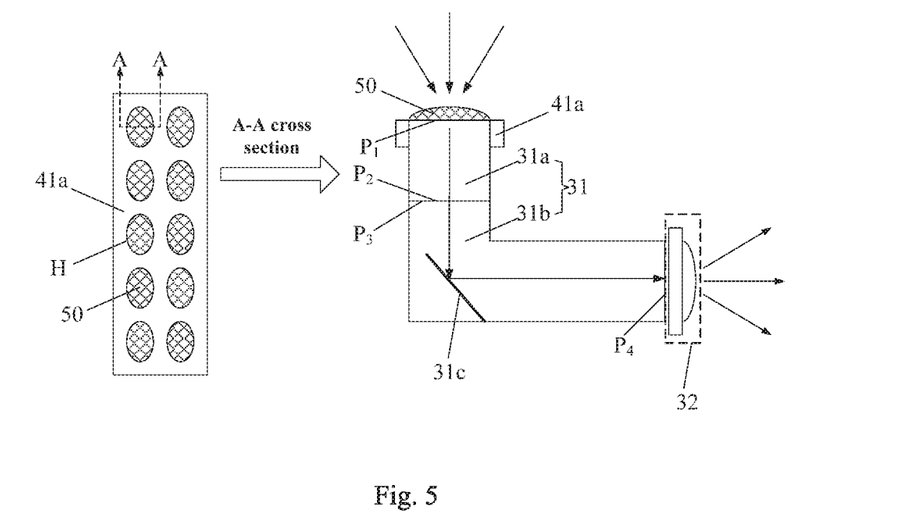
FIG. 5 is a schematic diagram of a structure of a light guide component of a display device according to an embodiment of the present disclosure.

In some embodiments, as shown in FIG. 5, at least one of the strip-like portions 41a has a plurality of holes H provided therein. Each hole H is covered by a light collector 50 which is configured to collect the ambient light and direct the collected ambient light to the light guide pipe 31. As shown in FIG. 5, particularly, the light guide pipe 31 includes a plurality of light guide branch pipes 31a connected to the holes H. Each light guide branch pipe 31a includes a first port $P_1$ and a second port $P_2$ provided opposite to each other. The first port $P_1$ is a light input port. The light guide pipe 31 further includes a transmission pipe 31b including a third port $P_3$ and a fourth port $P_4$ provided opposite to each other. The third port $P_3$ is configured to be connected to a plurality of the second port $P_2$ (in the cross sectional view of FIG. 5, only the second port $P_2$ of one light guide branch pipe 31a is shown), and the fourth port $P_4$ is a light output port. The transmission pipe 31b is provided therein with a reflection structure 31c for directing light which is emitted from the light guide branch pipe 31a to be transmitted along the transmission pipe 31b. The transmission pipe 31b may include, for example, a reflector sheet or a mirror.

After transmitted through the light guide pipe 31, the ambient light is emitted out of the fourth port $P_4$ towards the light homogenizing component 32.

In some embodiments, particularly, the light collector 50 covered on the hole H may be a light collecting cover or a light gathering cover, and a collecting surface of the light collecting cover may have a spherical or pyramidal shape so as to increase the area for receiving the ambient light and collect ambient light as much as possible.

Here, in order to collect ambient light as much as possible, the plurality of holes H and the plurality of light guide branch pipes 31a are arranged in a distribution manner. In this case, in order to direct the ambient light collected by the plurality of holes H to a side surface of the light guide plate, the ambient light output from the second ports $P_2$ near a transmission pipe 31b of the plurality of light guide branch pipes 31a may be collected by the third port $P_3$ of the transmission pipe 31b, and then output from the fourth ports $P_4$.

Figure 6:
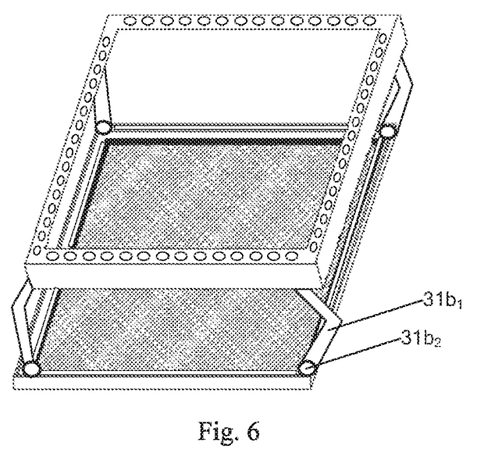
FIG. 6 is a schematic diagram of a local structure of a display device according to an embodiment of the present disclosure.

As shown in FIG. 6, particularly, the transmission pipe 31b may include a main light pipe $31b_1$ close to the second port $P_2$ and a light collecting pipe $31b_2$ (or referred to as a light outgoing pipe). An inlet of the main light pipe $31b_1$ as the third port $P_3$ may have a trumpet shape so as to collect the ambient light output from the second ports $P_2$ of the ones near the transmission pipe 31b of the plurality of light guide branch pipes 31a. An outlet of the light collecting pipe $31b_1$ is the fourth port.

Figure 7:
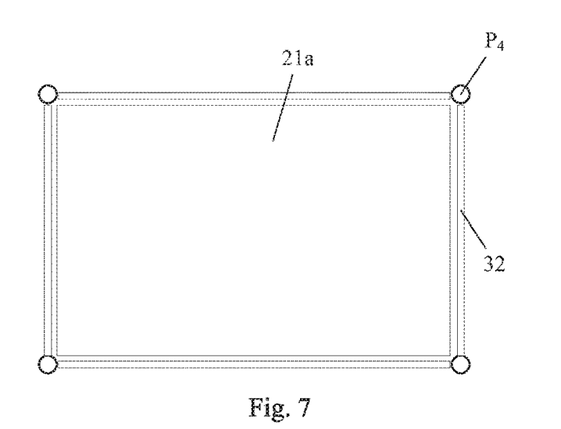
FIG. 7 is a schematic diagram of a light guide manner for directing ambient light to a side surface of a light guide plate in a display device according to an embodiment of the present disclosure.

As shown in FIG. 7, in some embodiments, the light homogenizing component 32 may be a reflection cover which has a simple structure and a small size, and is closely near a side surface $a_2$ of the light guide plate 21a. Further, as shown in FIG. 8, the reflection surface 32a of the reflection cover is configured to form a preset angle with respect to the side surface $a_2$ of the light guide plate close to the reflection surface so as to direct the light to the side surface $a_2$ of the light guide plate close to the reflection surface, and convert the ambient light emitted from the light output port (i.e., the fourth port $P_4$) into a reflection light with a uniform intensity to be emitted towards the light guide plate 21a.

Figure 8:
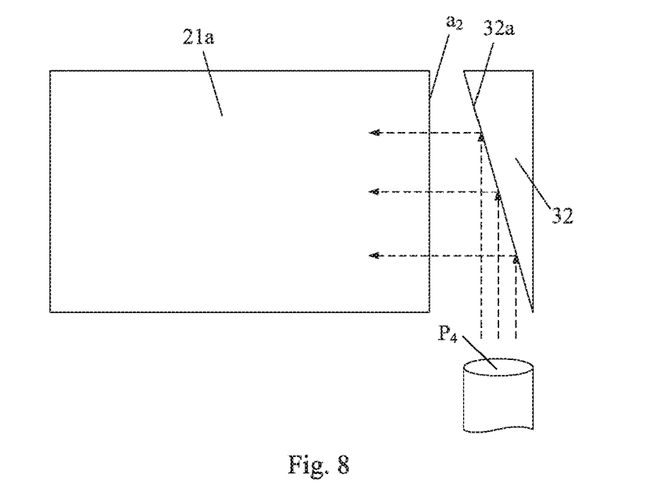
FIG. 8 is an enlarged structural diagram of the light guide plate and a light homogenizing component in FIG. 7.

The above preset angle may be set according to the parameters such as the dimensions of the reflection cover and the light guide plate 21a, as long as the ambient light emitted from the light output port (i.e., the fourth port $P_4$) can be emitted towards the side surface of the light guide plate 21a near the reflection surface 32a after the ambient light is reflected by the reflection surface 32a of the reflection cover, as indicated by the dotted arrows in FIG. 8.

In some embodiments, at least one of the side surfaces of the light guide plate 21a may be provided with the reflection cover. In a case that a side surface of the light guide plate 21a provided with a reflection cover is further provided with a light emitting component (such as a LED chip), the light emitting component may be provided between the reflection cover and the side surface of the light guide plate 21a.

In some embodiments, in order to improve the collection effect of the ambient light, each strip-like portion may be provided with a plurality of holes therein, as shown in FIGS. 6 and 7. There are four transmission pipes which are located at the four corners of the light guide plate, respectively. The third port of each transmission pipe is configured to be connected to all the light guide branch pipes located at one respective side surface of the light guide plate. That is, the second ports of all the light guide branch pipes at one side surface of the light guide plate are connected to a respective one of the third ports. There are four light homogenizing components which are provided closely near the four side surfaces of the light guide plate, respectively.

In some embodiments, the number of the transmission pipes may be two, and they are located at two opposite corners of the light guide plate, respectively. The third port of each transmission pipe is configured to be connected to all the light guide branch pipes located at two adjacent side surfaces of the light guide plate. The number of the light homogenizing components is two, and they are provided closely near two different side surfaces, which are in proximity to the two transmission pipes respectively, of the light guide plate.

Figure 9:
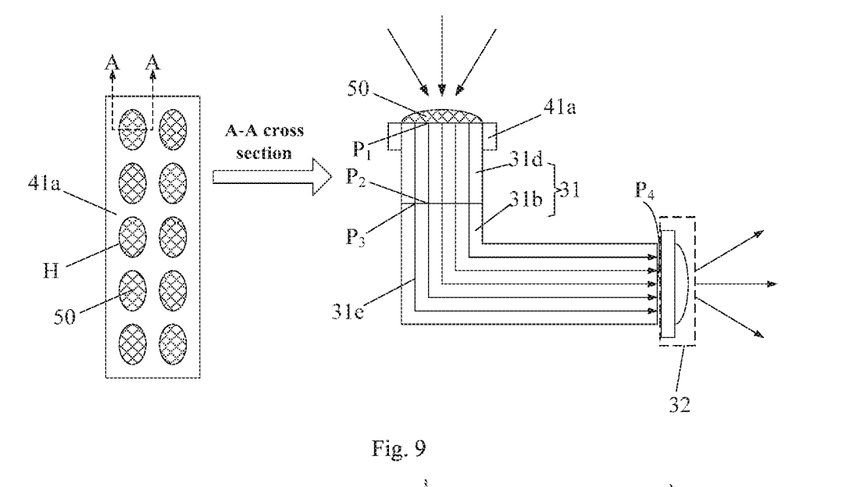
FIG. 9 is a schematic diagram of a structure of a light guide component of a display device according to an embodiment of the present disclosure.

In some embodiments, as shown in FIG. 9, at least one strip-like portion 41a has a plurality of holes H provided therein. Each hole H is covered by a light collector 50 which is configured to collect the ambient light and direct the collected ambient light to the light guide pipe 31. As shown in FIG. 9, particularly, the light guide pipe 31 includes a plurality of light incoming pipes 31d connected to the holes H. Each light incoming pipe 31d includes a first port $P_1$ and a second port $P_2$ provided opposite to each other. The first port $P_1$ is a light input port. The light guide pipe 31 further includes a transmission pipe 31b including a third port $P_3$ and a fourth port $P_4$ provided opposite to each other. The third port $P_3$ is configured to be connected to a plurality of the second port $P_2$ (in the cross sectional view of FIG. 9, only the second port $P_2$ of one light incoming pipe 31d is shown), and the fourth port $P_4$ is a light output port. A plurality of optical fibers 31e or a plurality of one-dimension defect photonic crystal light guide pipes 31e run through the light incoming pipes 31d and the transmission pipe 31b.

After transmitted through the light guide pipe 31, the ambient light is emitted out of the fourth port $P_4$ towards the light homogenizing component 32.

In some embodiments, particularly, the light collector 50 covered on the hole H may be a light collecting cover or a light gathering cover, and a collecting surface of the light collecting cover may have a spherical or pyramidal shape so as to increase the area for receiving the ambient light and collect ambient light as much as possible.

Here, in order to collect ambient light as much as possible, the plurality of holes H and the plurality of light incoming pipes 31d are arranged in a distribution manner. In this case, in order to direct the ambient light collected by the plurality of holes H to a side surface of the light guide plate, a third ports $P_3$ of a transmission pipes 31b may be connected to the second ports $P_2$ near the transmission pipe 31b) of the plurality of light incoming pipes 31d, so that the plurality of optical fibers 31e or the plurality of one-dimension defect photonic crystal light pipes 31e may output the ambient light from the fourth ports $P_4$ after running through the light incoming pipes 31d and the transmission pipe 31b.

Since the light is transmitted through the optical fibers or the one-dimension defect photonic crystal light pipes which may be bent to a certain extent, there is no need to provide a structure such as the reflector sheet or the mirror, and thus there is no any specific requirement to the shape of the light guide pipe 31.

As shown in FIG. 7, in some embodiments, the light homogenizing component 32 may be a reflection cover which has a simple structure and a small size, and is closely near a side surface $a_2$ of the light guide plate 21a. Further, as shown in FIG. 8, the reflection surface 32a of the reflection cover is configured to form a preset angle with respect to the side surface $a_2$ of the light guide plate close to the reflection surface so as to direct the light to the side surface $a_2$ of the light guide plate close to the reflection surface, and convert the ambient light emitted from the light output port (i.e., the fourth port $P_4$) into a reflection light with a uniform intensity to be emitted towards the light guide plate 21a.

The above preset angle may be set according to the parameters such as the dimensions of the reflection cover and the light guide plate 21a, as long as the ambient light emitted from the light output port (i.e., the fourth port $P_4$) can be emitted towards the side surface of the light guide plate 21a near the reflection surface 32a after the ambient light is reflected by the reflection surface 32a of the reflection cover, as indicated by the dotted arrows in FIG. 8.

In some embodiments, at least one of the side surfaces of the light guide plate 21a may be provided with the reflection cover. In a case that a side surface of the light guide plate 21a provided with a reflection cover is further provided with a light emitting component (such as a LED chip), the light emitting component may be provided between the reflection cover and the side surface of the light guide plate 21a.

In some embodiments, in order to improve the collection effect of the ambient light, each strip-like portion may be provided with a plurality of holes therein, as shown in FIGS. 6 and 7. The display device may include four light guide pipes, and thus there are accordingly four transmission pipes which are located at the four corners of the light guide plate, respectively. The third port of each transmission pipe is configured to be connected to all the light incoming pipes located at one respective side surface of the light guide plate. That is, the second ports of all the light incoming pipes at one side surface of the light guide plate are connected to a respective one of the third ports. There are thur light homogenizing components which are provided closely near the four side surfaces of the light guide plate, respectively.

In some embodiments, the number of the transmission pipes may be two, and they are located at two opposite corners of the light guide plate, respectively. The third port of each transmission pipe is configured to be connected to all the light incoming pipes located at two adjacent side surfaces of the light guide plate. The number of the light homogenizing components is two, and they are provided closely near two different side surfaces, which are in proximity to the two transmission pipes respectively, of the light guide plate.

Figure 10:
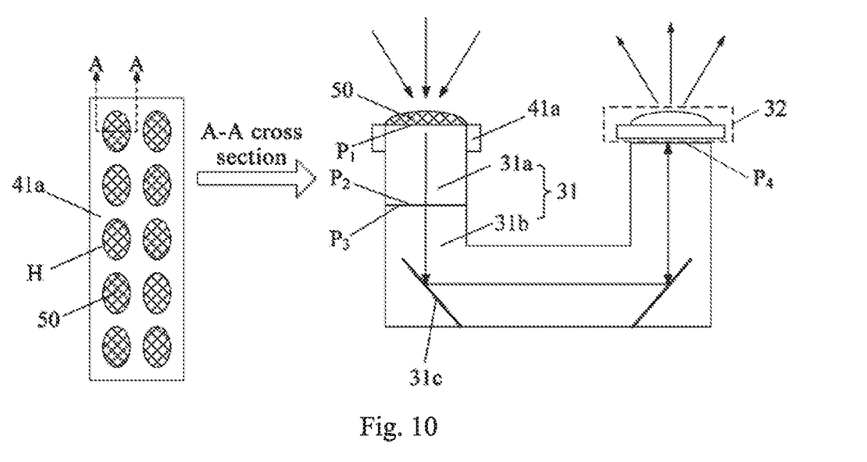
FIG. 10 is a schematic diagram of a structure of a light guide component of a display device according to an embodiment of the present disclosure.
Figure 11:
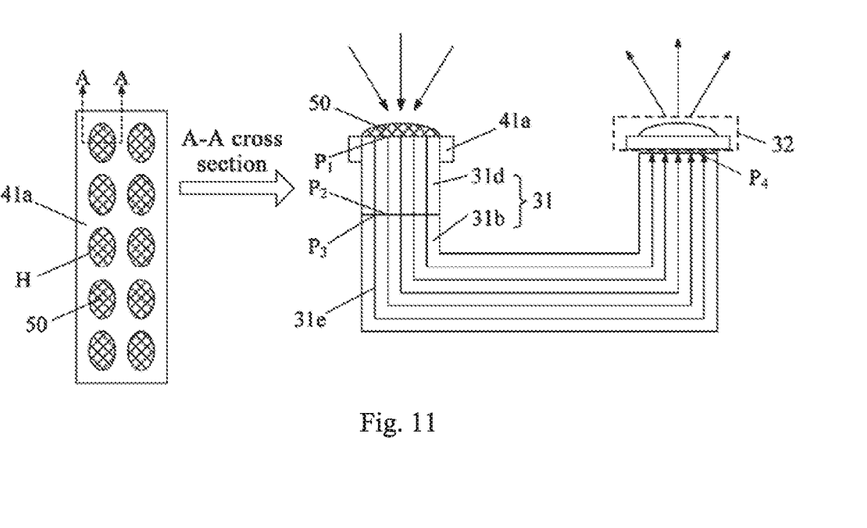
FIG. 11 is a schematic diagram of a structure of a light guide component of a display device according to an embodiment of the present disclosure.

In a case that the backlight assembly has a direct type backlight source, embodiments of specific structures of the light guide component are as shown in FIGS. 10 and 11.

The light guide component shown in FIG. 10 is similar to that shown in FIG. 5 in the principle and the structure, except that it has an additional reflection structure and the path of the transmission pipe 31b thereof is adaptively modified such that the light guide component is applicable to the backlight assembly having the direct type backlight source.

The light guide component shown in FIG. 11 is similar to that shown in FIG. 9 in the principle and the structure, except that the paths of the transmission pipe 31b and the plurality of optical fibers 31e or the plurality of one-dimension defect photonic crystal light pipe 31e are modified such that the light guide component is applicable to the backlight assembly having the direct type backlight source.

In the above display device provided by an embodiment of the present disclosure, the ambient light outside the display device is directed, by the light guide component, to at least one side surface of the light guide plate in the backlight assembly or the bottom of the diffusion plate, thereby the ambient light can be used to supplement to the light for displaying images of the liquid crystal display panel. When intensity of the ambient light is high, the light emitted by the light emitting component in the backlight assembly may be dimmed or turned off, i.e., an image is displayed by using the ambient light mainly, thereby reducing the energy consumption; when the intensity of the ambient light is low, the light emitted by the light emitting component may be turned on or lightened so as to supplement to the light for displaying images of the liquid crystal display panel, thereby improving the display effect.

Exemplary embodiments of the present disclosure have been described as above. However, the protective scope of the present disclosure is not limited thereto. Various modifications and variations within the technical scope disclosed by the present disclosure readily envisaged by an ordinary person skilled in the art should be also covered by the protective scope of the present disclosure which is defined by the appended claims only.

What is claimed is:

1. A display device comprising a liquid crystal display panel and a backlight assembly; the backlight assembly comprising a light diffusion component and a light emitting component optically coupled to the light diffusion component;
   wherein the display device further comprises a light guide component configured to direct ambient light to the light diffusion component,
   wherein the light diffusion component is a light guide plate comprising a light outgoing surface and four side surfaces connected to the light outgoing surface, the light emitting component is optically coupled to at least one of the side surface, and the light guide component is configured to direct the ambient light to the at least one of the side surfaces,
   wherein, the display device further comprises an outer frame for fixing the liquid crystal display panel and the backlight assembly together;
   the outer frame comprises an annular base plate provided in periphery of a display region of the liquid crystal display panel and a side wall connected to the annular base plate; and
   the light guide component is provided within an accommodation space formed by the annular base plate and the side wall, and
   wherein, the annular has plate comprises four strip-like portions connected together in sequence, and at least one of the strip-like portions has at least one hole provided therein; and
   the light guide component comprises at least one light guide pipe for transmitting light, each of the at least one light guide pine comprise a light input port and a light output port, the light input port is provided at the hole to receive the ambient light, and the light output port is configured to emit the ambient light outwards.

2. The display device of claim 1, wherein the liquid crystal display panel is a transflective liquid crystal display panel.

3. The display device of claim 1, wherein the light guide component further comprises a light homogenizing component provided at the light output port, and the light homogenizing component is configured to convert the ambient light emitted from the light output port into reflection light with a uniform intensity, and direct the reflection light to the at least one of the side surfaces.

4. The display device of claim 3, wherein each of the at least one light guide pipe comprises:
   at least one light guide branch pipe connected to the at least one hole, respectively, each of the at least one light guide branch pipe comprising a first port and a second port provided opposite to each other, the first port being the light input port;
   a transmission pipe comprising a third port and a fourth port provided opposite to each other, the third port being configured to be connected to the second port of each light guide branch pipe, the fourth port being the light output port; and
   a reflection structure provided in the transmission pipe, for causing light which is emitted from the at least one light guide branch pipe to be transmitted along the transmission pipe.

5. The display device of claim 3, wherein each of the at least one light guide pipe comprises:
   at least one light incoming pipe connected to the at least one hole, each of the at least one light incoming pipe comprising a first port and a second port provided opposite to each other, the first port being the light input port;
   a transmission pipe comprising a third port and a fourth port provided opposite to each other, the third port being configured to be connected to the second port of each light incoming pipe, the fourth port being the light output port; and
   at least one optical fiber or at least one one-dimension defect photonic crystal light pipe running through the at least one light incoming pipe and the transmission pipe.

6. The display device of claim 4, wherein,
   each of the strip-like portions is provided with at least one hole therein;
   the display device comprises four light guide pipes, transmission pipes of which are located at four corners of the light guide plate, respectively; and the third port of each transmission pipe is configured to be connected to all the light guide branch pipes located at one respective side surface of the light guide plate; and
   the display device comprises four light homogenizing components provided close to the four side surfaces of the light guide plate, respectively.

7. The display device of claim 5, wherein,
   each of the strip-like portions is provided with at least one hole therein;

the display device comprises four light guide pipes, transmission pipes of which are located at four corners of the light guide plate, respectively; and the third port of each transmission pipe is configured to be connected to all the light guide branch pipes located at one respective side surface of the light guide plate; and the display device comprises four light homogenizing components provided close to the four side surfaces of the light guide plate, respectively.

8. The display device of claim 3, wherein the light homogenizing component is a reflection cover, and a reflection surface of the reflection cover is configured to form a preset angle with respect to a side surface of the light guide plate close to the reflection surface such that the ambient light emitted from the light output port is reflected by the reflection surface and is directed to a side surface of the light guide plate close to the reflection surface.

9. The display device of claim 1, wherein the display device further comprises:

a light sensing component configured to sense an intensity of the ambient light around the display device to generate a sensed intensity value; and a control circuit coupled to the light sensing component, the control circuit being configured to compare the sensed intensity value with a reference intensity value to generate a comparative result, and control a luminous intensity of the light emitting component according to the comparative result.

10. The display device of claim 9, wherein the control circuit is further configured to:

turn off or dim light emitted by the light emitting component when the comparative result indicates that the sensed intensity value is greater than the reference intensity value; and turn on or lighten the light emitted by the light emitting component when the comparative result indicates that the sensed intensity value is equal to or less than the reference intensity value.

11. A display device comprising a liquid crystal display panel and a backlight assembly; the backlight assembly comprising a light diffusion component and a light emitting component optically coupled to the light diffusion component;

wherein the display device further comprises a light guide component configured to direct ambient light to the light diffusion component, wherein the light diffusion component is a diffusion plate comprising a light outgoing surface and a bottom surface opposite to the light outgoing surface, the light emitting component is optically coupled to the bottom surface, and the light guide component is configured to direct the ambient light to the bottom surface, wherein the display device further comprise an outer frame for fixing the liquid crystal display panel and the back light assembly together;

the outer frame comprises an annular base plate provided in periphery of a display region of the liquid crystal display panel and a side wall connected to the annular base plate; and the light guide component is provided within an accommodation space formed by the annular base plate and the side wall, wherein, the annular base plate comprises four strip-like portions connected together in sequence, and at least one of the strip-like portions has at least one hole provided therein; and the light guide component comprises at least one light guide pipe for transmitting light, each of the at least one light guide pipe composes a light input port and a light output port, the light input port is provided at the hole to receive the ambient light, and the light output port is configured to emit the ambient light outwards.

12. The display device of claim 11, wherein the light guide component further comprises a light homogenizing component provided at the light output port, and the light homogenizing component is configured to convert the ambient light emitted from the light output port into reflection light with a uniform intensity, and direct the converted reflection light to the bottom surface.

13. The display device of claim 12, wherein each of the at least one light guide pipe comprises:

at least one light guide branch pipe connected to the at least one hole, respectively, each of the at least one light guide branch pipe comprising a first port and a second port provided opposite to each other, the first port being the light input port; and a transmission pipe comprising a third port and a fourth port provided opposite to each other, the third port being configured to be connected to the second port of each light incoming pipe, the fourth port being the light output port; and the transmission pipe is provided therein with a reflection structure for causing light which is emitted from the light guide branch pipe to be transmitted along the transmission pipe.

14. The display device of claim 12, wherein each of the at least one light guide pipe comprises:

at least one light incoming pipe connected to the at least one hole, each of the at least one light incoming pipe comprising a first port and a second port provided opposite to each other, the first port being the light input port; and a transmission pipe comprising a third port and a fourth port provided opposite to each other, the third port being configured to be connected to the second port of each light incoming pipe, the fourth port being the light output port; and at least one optical fiber or at least one one-dimension defect photonic crystal light pipe running through the at least one light incoming pipe and the transmission pipe.

15. The display device of claim 11, further comprising:

a light sensing component configured to sense an intensity of the ambient light around the display device to generate a sensed intensity value; and a control circuit coupled to the light sensing component, the control circuit being configured to compare the sensed intensity value with a reference intensity value to generate a comparative result, and control a luminous intensity of the light emitting component according to the comparative result, and further configured to turn off or dim light emitted by the light emitting component when the comparative result indicating that the sensed intensity value is greater than the reference intensity value, and turn on or lighten the light emitted by the light emitting component when the comparative result indicating that the sensed intensity value is equal to or less than the reference intensity value.

* * * * *